(12) United States Patent
Okamura et al.

(10) Patent No.: US 6,885,170 B2
(45) Date of Patent: Apr. 26, 2005

(54) CONNECTION-SWITCHED CAPACITOR STORAGE SYSTEM

(75) Inventors: Michio Okamura, Kanagawa (JP); Masaaki Yamagishi, Kanagawa (JP)

(73) Assignees: Advanced Capacitor Technologies, Inc., Tokyo (JP); Okamura Laboratory, Inc., Kanagawa (JP); Kabushiki Kaisha Powersystems, Kanagawa (JP)

( * ) Notice: Subject to any disclaimer, the term of this patent is extended or adjusted under 35 U.S.C. 154(b) by 0 days.

(21) Appl. No.: 10/263,474

(22) Filed: Oct. 2, 2002

(65) Prior Publication Data

US 2003/0128013 A1 Jul. 10, 2003

(30) Foreign Application Priority Data

Oct. 2, 2001 (JP) ........................................ 2001-305944

(51) Int. Cl.⁷ ................................................ H02J 7/00
(52) U.S. Cl. ........................................ 320/166; 320/117
(58) Field of Search ................................ 320/166, 117, 320/116, 118, 120, 121, 126, 167, 122; 307/110

(56) References Cited

U.S. PATENT DOCUMENTS

| | | | |
|---|---|---|---|
| 5,734,205 A | * | 3/1998 | Okamura et al. ........... 307/110 |
| 5,886,887 A | | 3/1999 | Jenq ............................ 363/60 |
| 6,133,710 A | | 10/2000 | Okamura .................... 320/122 |
| 6,317,343 B1 | | 11/2001 | Okamura et al. ............. 363/59 |
| 6,323,623 B1 | * | 11/2001 | Someya et al. ............. 320/166 |
| 6,404,170 B2 | | 6/2002 | Okamura et al. ........... 320/166 |

\* cited by examiner

Primary Examiner—Michael Sherry
Assistant Examiner—Lawrence Luk
(74) Attorney, Agent, or Firm—Webb Ziesenheim Logsdon Orkin & Hanson, P.C.

(57) ABSTRACT

A connection-switched capacitor storage system comprises plural capacitors, parallel monitors connected with the capacitors, respectively, switches for switching the connections of the capacitors from a series combination to a parallel combination or vice versa, and a control portion. The parallel monitors bypass the charging current for the capacitors when the terminal voltages of the capacitors exceed a given voltage, thus limiting increases of the terminal voltages of initializing the terminal voltages of the capacitors to their original level. The control portion controls initialization and switching of the connections of the capacitors. The control portion causes the parallel monitors to initialize the capacitors near the voltage at which the connections of the capacitors are switched by the switches.

3 Claims, 6 Drawing Sheets

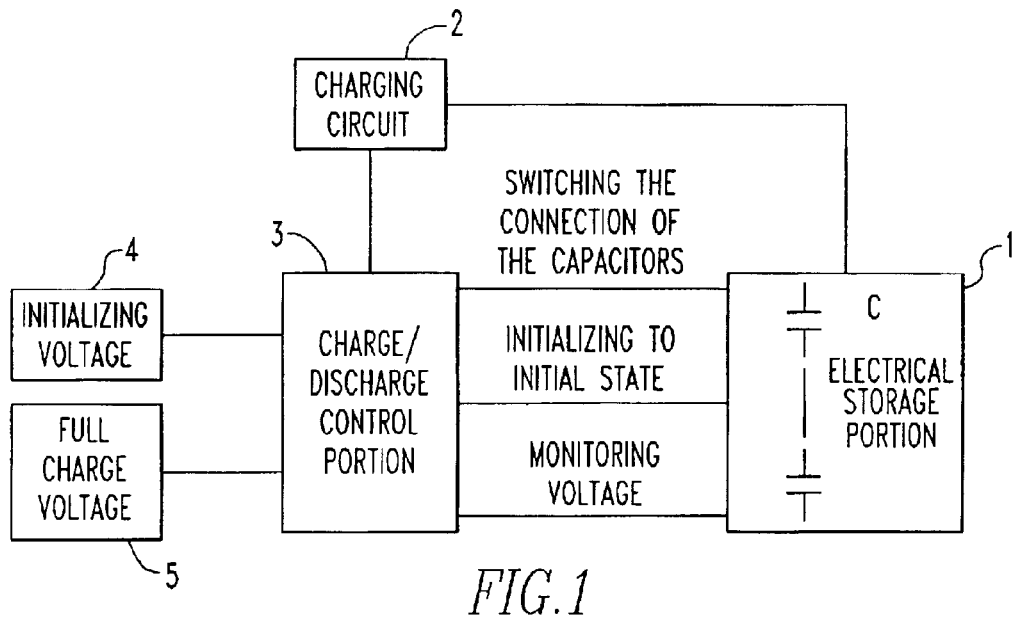
FIG.1
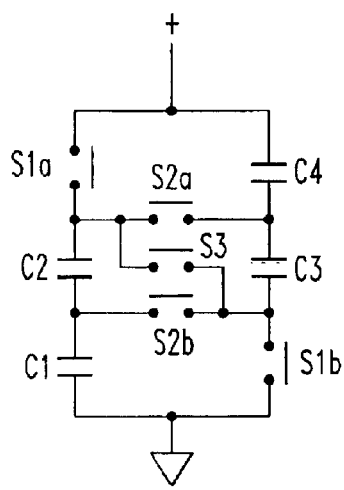 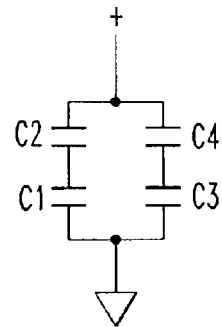 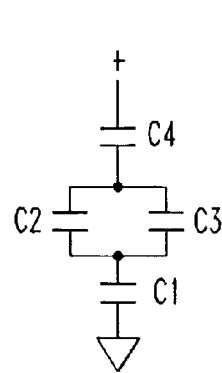 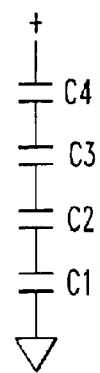
FIG.3a     FIG.3b     FIG.3c     FIG.3d

CONNECTION-SWITCHED CAPACITOR STORAGE SYSTEM

BACKGROUND OF THE INVENTION

1. Field of the Invention

The present invention relates to a connection-switched capacitor storage system comprising a plurality of capacitors, monitors connected in parallel with the capacitors, respectively, switches for switching the connections of the capacitors from a series combination to a parallel combination or vice versa, and control means. Each parallel monitor acts to bypass the charging current when the terminal voltage of the corresponding capacitor exceeds a given voltage value. Thus, the parallel monitors limit the terminal voltages of the capacitors to a voltage set for initializing. That is, the parallel monitors have a function of initializing the capacitors to their original state (hereinafter often referred to simply as initialization or initializing state). The control device controls the initializing operation of the parallel monitors according to the terminal voltages of the capacitors. The control device also controls the switching operation of the switches for switching the connections of the capacitors.

2. Description of Related Art

A capacitor storage system consisting of a combination of capacitors and an electronic circuit is known as an ECS (energy capacitor system). Those energy capacitor systems which are equipped with parallel monitors having a function of initializing capacitor voltages to their initial level and which have a function of switching the connections of the capacitors have been studied and verified in terms of their performance in a Japanese national project NEDO (New Energy and Industrial Technology Development Organization): Final Report of on-the-spot Research on new Procedure for Load Leveling, March 2000. Its performance has been valued highly and put into practical use.

Electric storage systems equipped with parallel monitors having a function of initializing capacitor voltages to their initial level have been proposed by the present Applicants and others, for example, in Japanese Patents Laid-Open Nos. 2000-152508, 2000-217250, and 2001-186681 (U.S. Pat. No. 6,404,170).

Electric storage systems having a function of switching the connections of capacitors have been also proposed by the present Applicants and others, for example, in Japanese Patents Laid-Open Nos. 2000-152495 (U.S. Pat. No. 6,133, 710), 2000-209775, and 2000-253572 (U.S. Pat. No. 6,317, 343).

An example of the structure of an electric storage system fitted with parallel monitors having a function of initializing capacitor voltages to their initial level is now given. FIG. 5 shows one example of the configuration of a capacitor storage portion having comparators acting as parallel monitors which are used, respectively, for initializing and for detection of a full charge condition. Shown in this figure are a charger 11, comparators 12, 13, OR-gates 14, 15, capacitors C, diodes D, resistors Rs, transistors Tr, and initializing switches S1. Vful and Vini indicate set voltages, respectively.

In FIG. 5, each capacitor C is an electric double-layer capacitor, for example, for storing electrical energy. The comparator 12 for initializing to initial state is used as a means for operating the transistor Tr connected in parallel with the capacitor C in such a way that the charging current is bypassed at the first set voltage Vini. The comparator 13 for detection of a full charge is used as a means for detecting the second set voltage Vful to judge that a full charge voltage higher than the first set voltage has been reached. When the capacitor C is initialized to its original state, if the terminal voltage of the capacitor C is about to exceed the set voltage Vini, the transistor Tr and resistor Rs together form a bypass circuit for the charging current, thus limiting the charging current. That is, a part of the charging current is bypassed. The current is set by the resistor Rs. The initializing switch S1 activates or deactivates the operation for initializing the capacitor C. When the initializing mode is selected, an initialization execution signal S issued by the charger 11 activates the operation.

The charger 11 charges plural capacitors C connected in series. The charger 11 stops the charging operation if a full charge voltage is detected from any capacitor C. For example, the outputs F from the comparators 13 for detection of a fully charged state are logically ORed. Thus, the charger judges which of the plural capacitors has reached full charge. Then, the charging is ended. Furthermore, when charging for initialization is started, the charger 11 turns on (closes) the initializing switch S1 by the initialization execution signal S, thus starting charging. The outputs I from the comparators 12 for initializing the capacitors are logically ORed. Thus, the charger judges which of the capacitors has started to undergo an operation for bypassing the charging current. The bypass operation signals I from the comparators 12 are ORed by each OR gate 14. Output signals F from the comparators 13 indicating a full charge are ORed by each OR gate 15, and a signal for stopping constant-current charging is supplied to the charger 11.

Accordingly, the set voltage Vful is set to the full charge voltage of each capacitor. The set voltage Vini is set to an initializing voltage lower than the set voltage Vful. When the initializing switch S1 is closed (turned ON) and charging is done, the capacitor charged to the set voltage Vini first is first started to be charged at a decreased charging rate by the bypass circuit consisting of the transistor Tr and resistor Rs by bypassing a part of the charging current. In this way, the capacitors are successively charged at a decreased charging rate. When any capacitor reaches full charge, the charger 11 stops the constant-current charging. If necessary, trickle charging is done.

An example of the configuration of an electric storage system having a function of switching the connections of capacitors is next described. FIGS. 6a to 6c show one example of the configuration of a capacitor storage system in which the connections of capacitors are switched. Shown in these figures are capacitors CA1–CA3, CB1–CB3 and switches SS, SA1–SA3, SB1–SB3.

Referring to FIGS. 6a to 6c, the capacitors CA1–CA3 and CB1–CB3 form two sets of capacitors A and B. Each set of capacitors is made up of the same number of capacitors connected in series. Each of the capacitors CA1–CA3 and CB1–CB3 may be a capacitor bank consisting of plural capacitors connected in series or parallel-series. If necessary, a parallel monitor is appropriately connected with each capacitor. The switch SS is a series-connection switch for connecting the two sets of capacitors A and B in series. One set of capacitors A and the switch SS are connected at a series connection point. The switches SA1–SA3 are one set of switching means for connecting this series connection point with one series connection point of the other set of capacitors B and with the series connection points between the capacitors CB1–CB3. The switches SB1–SB3 are the other set of switching means for connecting the series connection point between the set of capacitors B and the switch SS with the other series connection end of the set of capacitors A and with the series connection points between the capacitors A.

Then, the capacitors CA1–CA3 and CB1–CB3 are connected in series as shown in FIG. 6d by closing only the switch SS as shown in FIG. 6a. The center capacitor CA3 of one set of capacitors A and the center capacitor CB3 of the other set of capacitors B are connected in parallel as shown in FIG. 6e by opening the switch SS and closing the switch SA3 of one set of switching means and the corresponding switch SB3 of the other set of switching means as shown in FIG. 6b.

Similarly, the series combination of the center capacitors CA3 and CA2 of one set of capacitors A and the series combination of the center capacitors CB3 and CB2 of the other set of capacitors B are connected in parallel as shown in FIG. 6f by closing the switch SA2 of one set of switching means and the corresponding switch SB2 of the other set of switching means and opening all the other switches as shown in FIG. 6c.

Then, the series combination of the capacitors CA1–CA3 of one set of capacitors A and the series combination of the capacitors CB1–CB3 of the other set of capacitors B are connected in parallel as shown in FIG. 6g by closing the switch SA1 of one set of switching means and the corresponding switch SB1 of the other set of switching means and opening all the other switches.

As described above, the connections of the plural capacitors CA1–CA3 and CB1–CB3 are switched and controlled as shown in FIGS. 6d to 6g, by selectively connecting one of the switches SA1–SA3 of one set of switching means and one of the switches SB1–SB3 of the other set of switches or the switch SS. In this way, the voltages are adjusted. Variations in the voltages accompanying charging and discharging can be suppressed. For example, the capacitors CA1–CA3 and CB1–CB3 are all connected in series and charging is started as shown in FIG. 6d. When the terminal voltage on the charging side rises to a given value, the voltage is lowered by an amount corresponding to the capacitors CA3 and CB3 by switching the combination to the combination shown in FIG. 6e. Furthermore, if the terminal voltage on the charging side again increases to the given value due to charging, the terminal voltage on the charging side can be prevented from exceeding the given value by switching the combination successively to the combinations respectively shown in FIGS. 6f and 6g.

Where discharging is started in the connection combination shown in FIG. 6g and the load is fed, if the output voltage drops to the given value, the decrease in the output voltage is compensated by switching the connection combination to the combination shown in FIG. 6f. If the output voltage further drops to a certain value, the connection combination is successively switched to the connection combinations respectively shown in FIGS. 6e and 6d. Consequently, the output voltage can be prevented from decreasing below the certain value. Furthermore, the overall current flowing during charging and discharging is allocated to only the switch SS that connects all the capacitors CA1–CA3, CB1–CB3 in series. The other switches SA1–SA3 and SB1–SB3 only need to have a current capacity that is half of the overall current. In addition, only one switch is connected in series with each capacitor at any stage. Therefore, loss caused by turn-on voltage of switches, which would present a problem where the switches were made of semiconductors, can be reduced to a minimum.

In the system used thus far, however, parallel monitors having a function of initializing capacitors to their initial state and a function of switching the connections of the capacitors between series and parallel combinations are combined in a simple manner as mentioned previously. Therefore, there arises the case where both functions perform conflicting operations. It has been confirmed that the energy efficiency of the capacitor storage system can drop.

The observed decreases of the efficiency are only 1% to 2%. However, the actual value of the overall charge/discharge efficiency of the whole capacitor storage system using switching of the connections of capacitors is as high as 94%. Therefore, where the decreases of the efficiency are only 1% to 2% as mentioned previously, increasing the efficiency further will greatly contribute to expansion of the application of the capacitor storage system.

SUMMARY OF THE INVENTION

The present invention is intended to solve the foregoing problem. It is an object of the present invention to provide a capacitor storage system which has a function of switching the connections of capacitors and provides improved energy efficiency by reducing power loss caused when the capacitors having parallel monitors are initialized to their initial state.

This object is achieved by a connection-switched capacitor storage system comprising: a plurality of capacitors; parallel monitors connected in parallel with the capacitors, respectively, each of the parallel monitors acting to limit increases of the terminal voltage of a respective one of the capacitors by bypassing a charging current for the capacitor when the terminal voltage exceeds a given set voltage, the parallel monitors having a function of initializing their respective capacitors to their initial state; switching means for switching the connections of the capacitors from a series combination to a parallel combination or vice versa; and control means for controlling initializing operation of each parallel monitor to initialize the terminal voltage of a respective one of the capacitors to its initial level based on the overall voltage of the capacitors or on the terminal voltage of a given capacitor typical of the plurality of capacitors, the control means also acting to control operation of the switching means to switch the connections of the capacitors. The control means causes the parallel monitors to initialize the terminal voltages of the capacitors near a voltage at which the connections of the capacitors are switched by the switching means.

The control means is characterized in that it causes the parallel monitors to perform an initializing operation to initial state at a voltage immediately preceding the voltage at which the connections of the capacitors are switched by the switching means. The control means causes only those of the parallel monitors whose connections should be switched by the switching means to perform the initializing operation. Alternatively, when all of the capacitors are connected in series, the control means causes the parallel monitors to perform the initializing operation. The control means causes the parallel monitors to perform the initializing operation at a voltage assumed immediately after the connections of the capacitors are switched by the switching means.

Other objects and features of the invention will appear in the course of the description thereof, which follows.

BRIEF DESCRIPTION OF THE DRAWINGS

FIG. 1 is a block diagram of a connection-switched capacitor storage system according to the present invention;

FIGS. 3a–3d are diagrams showing a method of switching the connections of shift-type, two stages of capacitors;

DESCRIPTION OF THE PREFERRED EMBODIMENTS

Embodiments of the present invention are hereinafter described with reference to the accompanying drawings. Referring to FIG. 1, there is shown a connection-switched capacitor storage system according to the present invention, the capacitor storage system being fitted with parallel monitors. This system has an electrical storage portion 1, a charging circuit 2, and a charge/discharge control portion 3. The electrical storage portion 1 includes capacitors C. A set voltage used for initializing to initial state is indicated by 4. Another set voltage used for switching or full charge is indicated by 5.

In FIG. 1, the electrical storage portion 1 includes the capacitors C having parallel monitors as shown in FIG. 5 and FIGS. 6a to 6g as well as switches for switching the connections of the capacitors from a series combination to a parallel combination or vice versa as shown in FIGS. 6a to 6g. The electrical storage portion has a function of switching the connections of the parallel monitors and the capacitors C. The parallel monitors have a function of initializing the capacitors to their initial state. The charging circuit 2 controls the charging current and charges the capacitors C of the electrical storage portion 1 in plural charging modes including constant-current charging mode and trickle charging mode. The charge/discharge control portion 3 monitors voltages in the electrical storage portion 1, controls initializing to initial state, and switches the connections of the capacitors, thus controlling the charging circuit 2.

Figure 5:
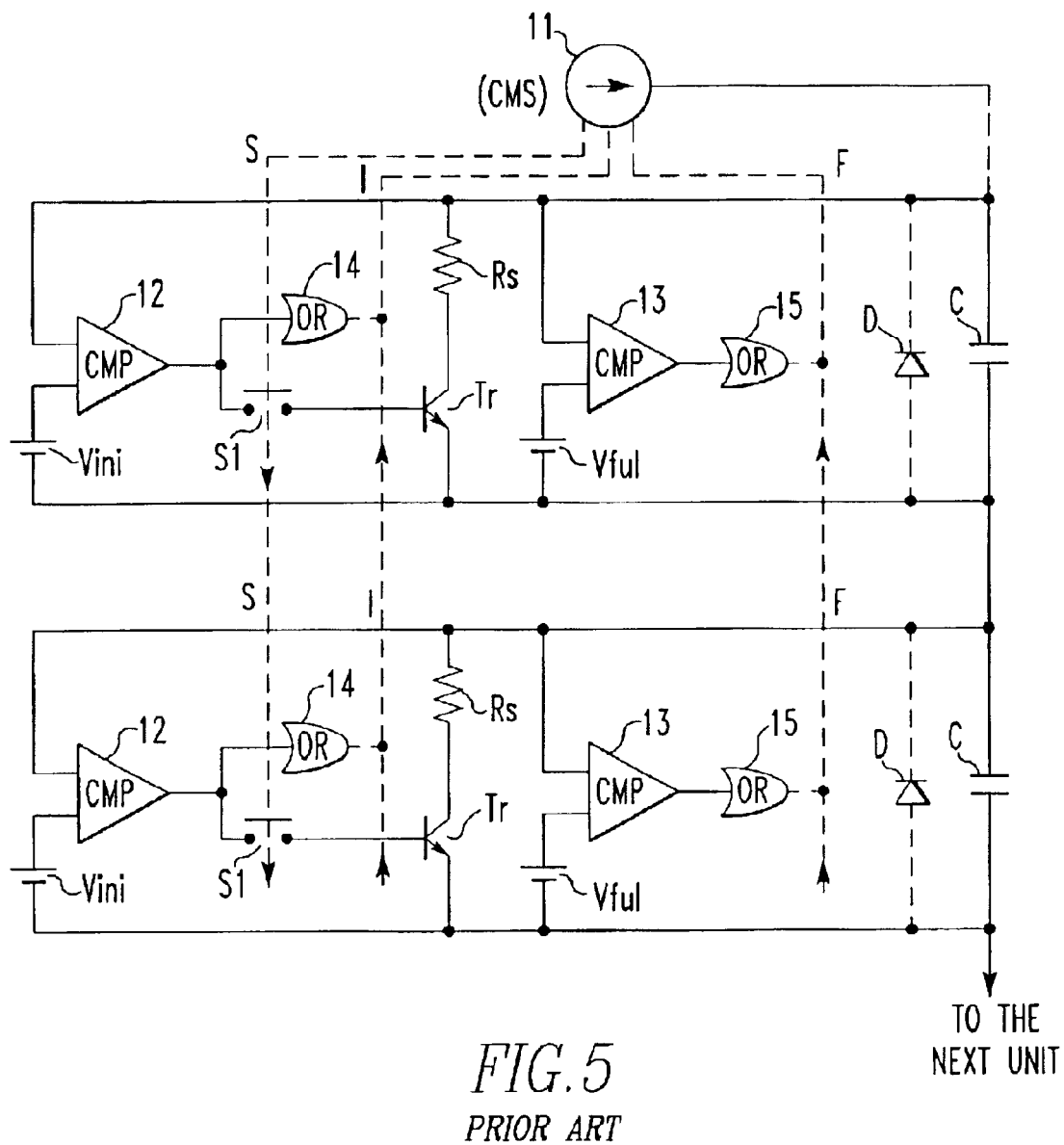
FIG. 5 is a diagram showing one example of a capacitor storage portion having parallel monitors acting as comparators which are used respectively for initializing to initial state and for detection of a full charge.
Figure 6C:
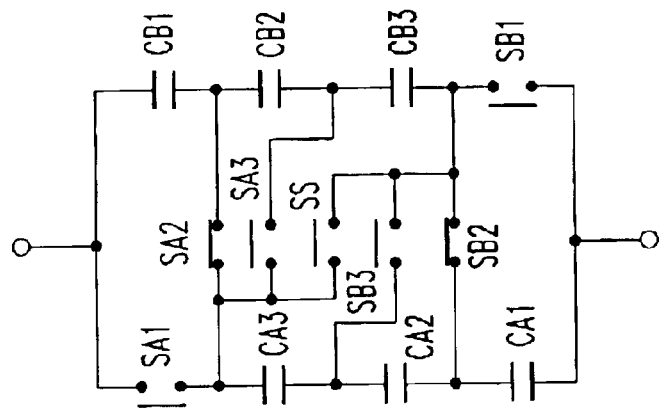
FIGS. 6a–6g are diagrams showing one example of the configuration of a connection-switched capacitor storage system according to the present invention.
Figure 6B:
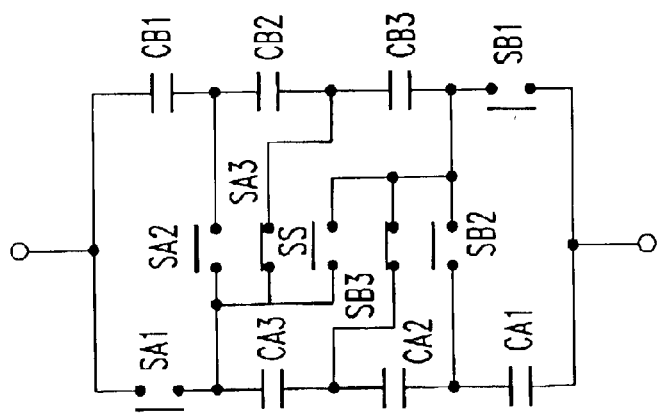
Figure 6A:
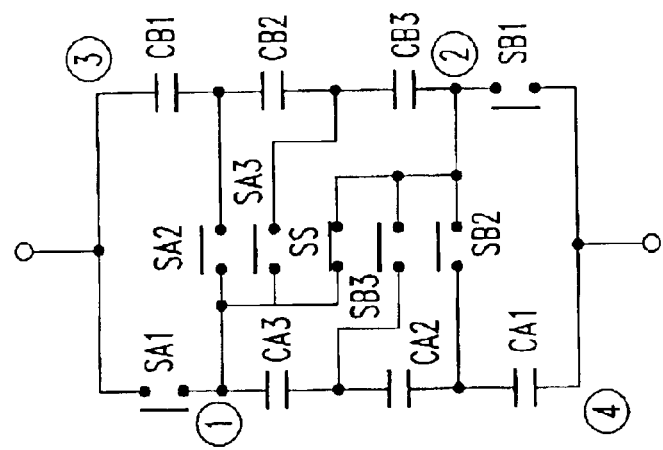
Figure 6G:
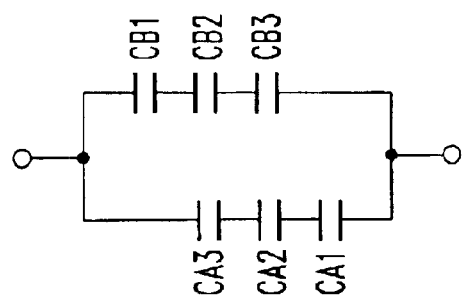
Figure 6F:
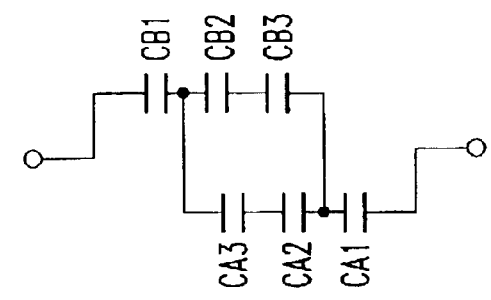
Figure 6E:
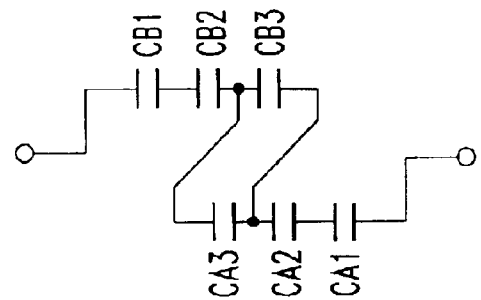
Figure 6D:
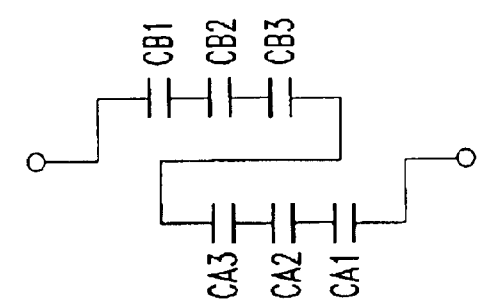

When the charge/discharge control portion 3 is monitoring the voltages in the electrical storage portion 1, the control portion detects the terminal voltage of each capacitor C or the terminal voltage of a typical one of the capacitors C, thus monitoring the charge state. For example, in the circuit shown in FIG. 5, the control portion 3 monitors a bypass operation signal I for initializing to initial state and a bypass operation signal F on full charge. When an initializing operation to initial state is performed and the charge/discharge control portion 3 controls the initializing operation of the electrical storage portion 1, the initializing circuit is activated. In the circuit of FIG. 5, for example, switches S1 are closed by an initialization execution signal S. When the charge/discharge control portion 3 switches the connections of the capacitors in the electrical storage portion 1, the control portion monitors the voltages in the electrical storage portion 1, judges a switching voltage, and controls the switches, thus switching the connections of the capacitors. For instance, in the circuit shown in FIG. 6a, the control portion controls the states of switches SS, SA1–SA3, and SB1–SB3, i.e., selectively opens and closes them. When the charge/discharge control portion 3 controls the charging circuit 2, the control portion monitors the charge state of the electrical storage portion 1 to thereby judge whether a full charge has been reached. Then, the charging is stopped or the charging mode is switched to trickle charging mode. For example, in the circuit shown in FIG. 5, the bypass operation signal F on full charge is detected, and the full charge state is determined.

The set voltage 4 for initializing to initial state is stored, for example, in a memory that holds the set voltage Vini for setting each capacitor of the electrical storage portion 1 to its initial state. Where all the capacitors are connected in series and initialized to their initial state, for example, according to an initialization execution mode (described later), the voltage Vini is set for each individual capacitor, if the connections of some capacitors have been switched to parallel combinations and initialization should be done. The set voltage 5 for switching or full charge is stored, for example, in a memory that holds the full charge voltage Vful at which the connections of the capacitors of the electrical storage portion 1 are switched, charging is stopped, or charging mode is switched to trickle charging. The voltage at which the connections of the capacitors are switched may be the overall voltage of the electrical storage portion 1 or the terminal voltage of a capacitor that forms a reference. For example, in the circuit shown in FIGS. 6a to 6g, whenever the overall voltage of the electrical storage portion 1 reaches a given voltage, the connections are switched from combination D to combination E, from combination E to combination F, and from combination F to combination G. The charging is stopped when a full charge condition is reached. At this time, the determination may be made based on the terminal voltage of the capacitor CA1 while regarding it as a typical capacitor.

Figure 2:
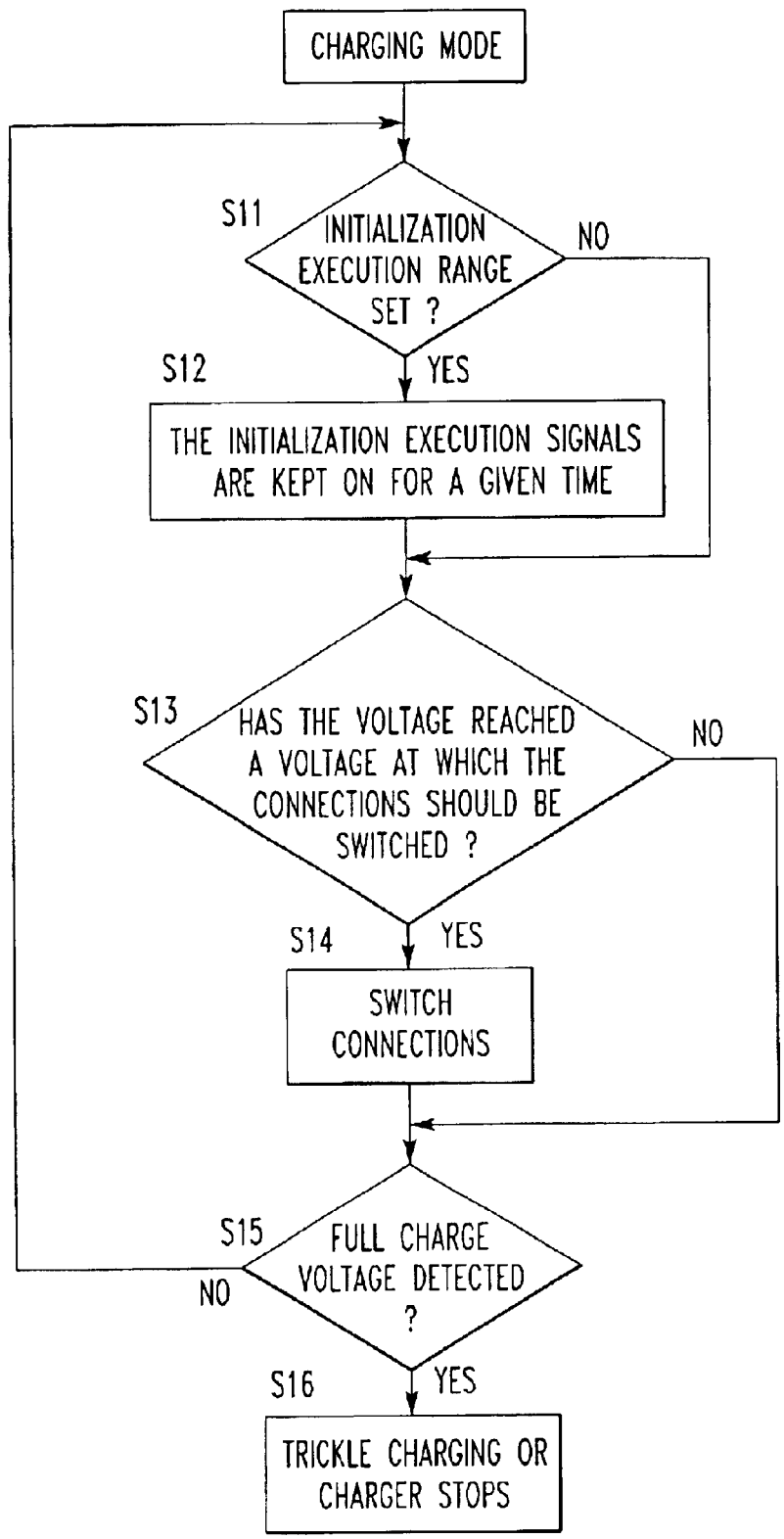
FIG. 2 is a flowchart schematically illustrating processing performed by the capacitor storage system shown in FIG. 1 in charging mode, the processing including execution of an initializing operation.
Figure 4:
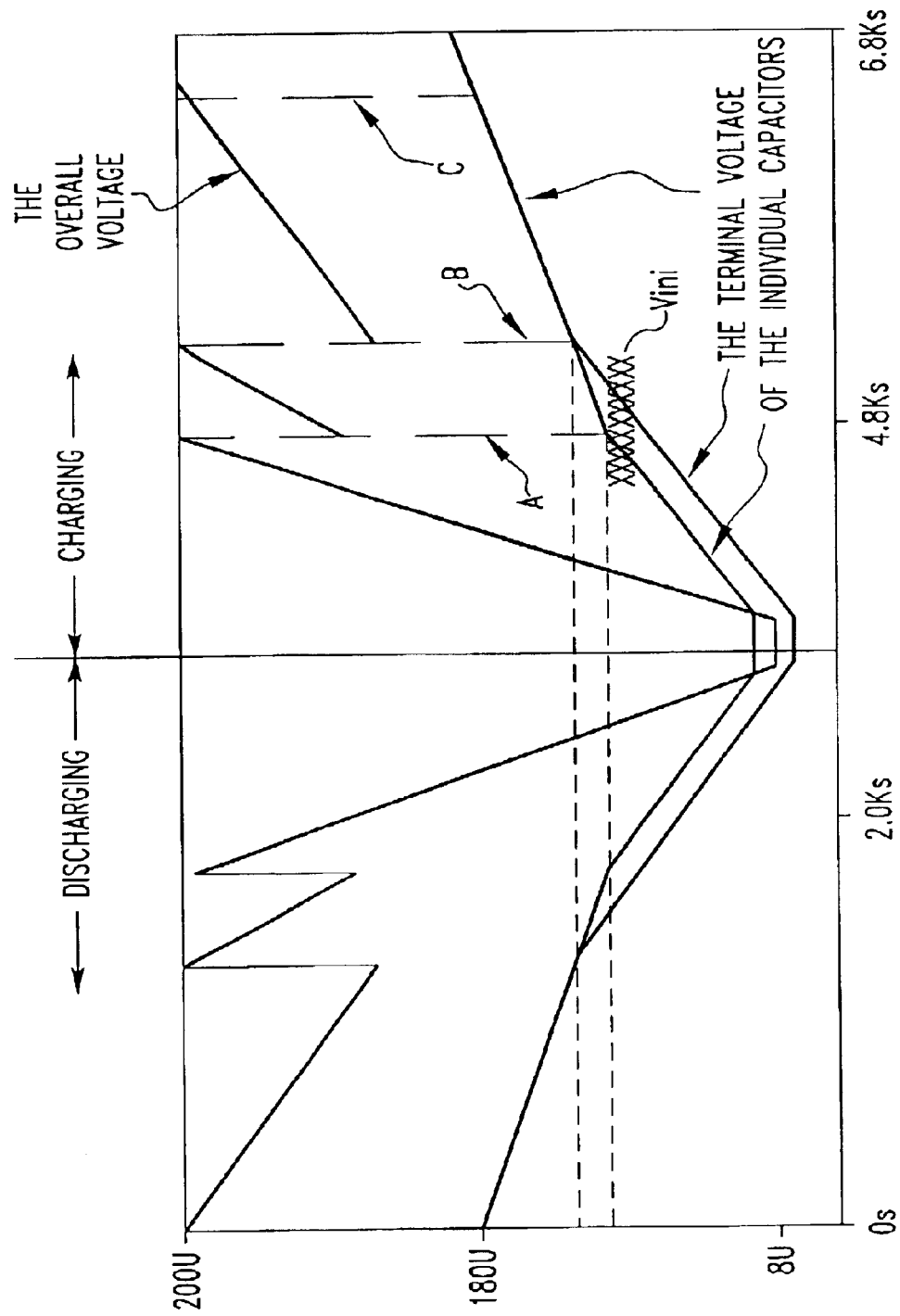
FIG. 4 is a diagram illustrating the variations in the overall current flowing through an electrical storage portion 1 of a capacitor storage system according to the present invention when the connections of the capacitors are switched, variations in the terminal voltages of the capacitors, and an example of a method of setting a voltage Vini used for initializing to initial state.

FIG. 2 is a flowchart schematically illustrating processing performed in charging mode, the processing including execution of initializing to initial state. FIG. 3 is a diagram showing a method of switching the connections of shift-type, two stages of capacitors. FIG. 4 shows variations of the overall voltage of the electrical storage portion 1 when the connections of the two stages of capacitors of shift type are switched, variations in the terminal voltages of the capacitors, and an example of a method of setting a voltage Vini used for initializing to initial state.

Referring to the flowchart of FIG. 2, the processing in the charging mode including execution of initialization begins with making a decision as to whether the voltage has reached a voltage range in which initializing to initial state can be executed (step S11). When the voltage has reached the range, the initialization execution signal S for the capacitors to be initialized is kept ON for a given time (step S12). A decision is made as to whether the voltage has reached a voltage at which the connections should be switched (step S13). If the voltage has reached the latter voltage, only those switches which correspond to the capacitors whose connections should be switched are switched (step S14). After that, if a full charge voltage is detected (step S15), trickle charging is done, or charger stops (step S16).

Some methods are available to switch the connections of the capacitor depending on the type of arrangement of the capacitors and on the number of stages of the capacitors. A shift-type, two-stage-switched capacitor arrangement consisting of four capacitors is shown in FIGS. 3a to 3d. Variations of the overall voltage of the electrical storage portion 1 when the connections of the capacitors are switched are shown in FIG. 4. Variations of the voltages of the capacitors are also shown in FIG. 4. An example of a method of setting the voltage Vini used for initializing to initial state is also shown in FIG. 4. The connections of the capacitors are switched from a combination shown in FIG. 3d to a combination shown in FIG. 3c at point A of FIG. 4. The connections of the capacitors are switched from the combination shown in FIG. 3c to a combination shown in FIG. 3b at point B of FIG. 4. At point A of FIG. 4, capacitors C2 and C3 are switched from a series combination to a parallel combination. Therefore, if there is a difference between the charging voltage of the capacitor C2 and the charging voltage of the capacitor C3 at this point, the higher one is discharged, while the lower one is charged. A relatively large current is supplied. The two capacitors are forced to have the same voltage in a short time.

If the capacitor bank is made up of a single capacitor, essentially the same operation is performed, though the method is different from the initializing of parallel monitors. In this circuit, if the set voltage Vini set for initializing the parallel monitors to their initial state is selected to lie at point C of FIG. 4 that is close to the full charge set voltage Vful where the capacitor bank is not affected by switching of the connections of the capacitors, each capacitor will experience two operations in one charging cycle, i.e., initializing operation and equalizing operation under different conditions. In actual operation, the initializing operation is performed relatively slowly. The connections of the capacitors are switched almost instantly. Therefore, priority is given to the latter voltage allotment. If the initializing operation using the parallel monitor is performed more completely, then more electric power will be consumed. The result is that the charge/discharge efficiency of the electrical storage system drops.

The present invention is characterized in that the voltage Vini for the parallel monitors is essentially set in such a way that the initializing operation using the parallel monitors is completed before an operation for switching the connections of the capacitors is started. In this case, all the capacitors C1–C4 may be initialized to their original state immediately before the connections of the capacitors are switched from the combination of FIG. 3d to the combination of FIG. 3c. Alternatively, only the capacitors C2 and C3 whose connections should be switched may be initialized (point A of FIG. 4), and only capacitors C1 and C4 whose connections should be switched may be initialized (point B of FIG. 4) immediately before the connections of the capacitors are switched from the combination of FIG. 3c to the combination of FIG. 3b.

It is to be understood that the present invention is not limited to the embodiment above but various changes and modifications are possible. For example, in the embodiment above, initialization is done immediately before the connections of some capacitors are switched. The initialization may also be done immediately after the connections of such capacitors are switched. Energy loss due to two operations, i.e., initializing and equalization, increases in going away from the points A and B at which the connections of the capacitors are switched, such as the point C of FIG. 4. Therefore, the loss can be reduced greatly simply by bringing the initializing point close to the points A and B where the connections of the capacitors are switched instead of close to the point C of FIG. 4 (e.g., a voltage point lying in an approximately ±10% range about the voltage point at which the connections of the capacitors are switched). This corresponds to voltages within a minus 10% range from the voltage at which the connections are switched where initialization is done immediately before the connections are switched. It corresponds to voltages within a plus 10% range from the voltage at which the connections are switched where initialization is done immediately after the connections are switched. Furthermore, the voltage Vini set for initialization and the full charge set voltage Vful may be held by the voltage-setting memory 4 and the switching-and-full charge-setting memory 5, respectively. The parallel monitors for the capacitors of the electrical storage portion 1 may be set by the charge/discharge control portion 3. In addition, parallel monitors having fixed settings may also be used.

As can be understood from the description made thus far, the present invention provides a connection-switched capacitor storage system comprising: a plurality of capacitors; parallel monitors connected in parallel with the capacitors, respectively, each of the parallel monitors acting to limit increases of the terminal voltage of a respective one of the capacitors by bypassing a charging current for the capacitor when the terminal voltage exceeds a given set voltage, the parallel monitors having a function of initializing their respective capacitors to their initial state; switching means for switching the connections of the capacitors from a series combination to a parallel combination or vice versa; and control means for controlling initializing operation of each parallel monitor to initialize the terminal voltage of a respective one of the capacitors to its initial level based on the overall voltage of the capacitors or on the terminal voltage of a given capacitor typical of the plurality of capacitors. The control means also acts to control the operation of the switching means to switch the connections of the capacitors. The control means causes the parallel monitors to initialize the terminal voltages of the capacitors near a voltage at which the connections of the capacitors are switched by the switching means. Therefore, the initialization is done at a low voltage. This reduces power loss. Decrease of the efficiency due to switching of the connections of the capacitors can be alleviated.

Initialization using the parallel monitors is done by the control means at a voltage assumed immediately before the connections of the capacitors are switched by the switching means. The control means causes the parallel monitors to initialize only capacitors whose connections should be switched by the switching means. Alternatively, when all the capacitors are connected in series, initialization using the parallel monitors is done. In addition, the control means causes the parallel monitors to initialize their respective capacitors at a voltage assumed immediately after the connections of the capacitors are switched by the switching means. Only capacitors whose connections have not been switched by the switching means are initialized by the parallel monitors. Therefore, power loss due to initialization is reduced to a minimum. The power loss of the capacitors having the parallel monitors due to initialization is decreased. The energy efficiency of the electrical storage system having a function of switching the connections of the capacitors can be improved.

Having thus described our invention with the detail and particularity required by the Patent Laws, what is desired protected by Letters Patent is set forth in the following claims.

The invention claimed is:

1. A connection-switched capacitor storage system comprising:

a plurality of capacitors;

parallel monitors connected in parallel with said capacitors, respectively, each of said parallel monitors acting to limit increases of a terminal voltage of a respective one of the capacitors by bypassing a charging current for the capacitor when the terminal voltage exceeds a given set voltage, the parallel monitors having a function of initializing terminal voltages of the capacitors to their initial state;

switching means for switching connections of said capacitors from a series combination to a parallel combination or vice versa; and control means for controlling the initializing operation of each parallel monitor to initialize the terminal voltage of a respective one of the capacitors to its initial level based on an overall voltage of the capacitors or on the terminal voltage of a certain capacitor typical of said plurality of capacitors, said control means also acting to control operation of said switching means to switch the connections of the capacitors, wherein said voltage at which the connections of the capacitors are switched by said switching means is within a ±10% range about the voltage at which the connections of the capacitors are switched, and wherein said control means causes said parallel monitor to initialize the capacitor voltages to their initial level near a voltage at which the connections of the capacitors are switched by said switching means.

2. A connection-switched capacitor storage system comprising:

a plurality of capacitors;

parallel monitors connected in parallel with said capacitors, respectively, each of said parallel monitors acting to limit increases of a terminal voltage of a respective one of the capacitors by bypassing a charging current for the capacitor when the terminal voltage exceeds a given set voltage, the parallel monitors having a function of initializing terminal voltages of the capacitors to their initial state;

switching means for switching connections of said capacitors from a series combination to a parallel combination or vice versa; and control means for controlling the initializing operation of each parallel monitor to initialize the terminal voltage of a respective one of the capacitors to its initial level based on an overall voltage of the capacitors or on the terminal voltage of a certain capacitor typical of said plurality of capacitors, said control means also acting to control operation of said switching means to switch the connections of the capacitors, wherein said voltage assumed immediately before the connections of the capacitors are switched by said switching means is within a minus 10% range from the voltage at which the connections are switched, and wherein said control means causes said parallel monitors to initialize the capacitor voltages to their initial level near a voltage at which the connections of the capacitors are switched by said switching means.

3. A connection-switched capacitor storage system comprising:

a plurality of capacitors;

parallel monitors connected in parallel with said capacitors, respectively, each of said parallel monitors acting to limit increases of a terminal voltage of a respective one of the capacitors by bypassing a charging current for the capacitor when the terminal voltage exceeds a given set voltage, the parallel monitors having a function of initializing terminal voltages of the capacitors to their initial state;

switching means for switching connections of said capacitors from a series combination to a parallel combination or vice versa; end control means for controlling the initializing operation of each parallel monitor to initialize the terminal voltage of s respective one of the capacitors to its initial level based on an overall voltage of the capacitors or on the terminal voltage of a certain capacitor typical of said plurality of capacitors, and control means also acting to control operation of said switching means to switch the connections of the capacitors, wherein said voltage assumed immediately after the connections of the capacitors are switched by said switching means is within a plus 10% range from the voltage at which the connections of the capacitors are switched, and wherein said control means causes said parallel monitors to initialize the capacitor voltages to their initial level near a voltage at which the connections of the capacitors are switched by said switching means.

* * * * *

UNITED STATES PATENT AND TRADEMARK OFFICE
CERTIFICATE OF CORRECTION

PATENT NO. : 6,885,170 B2
DATED : April 26, 2005
INVENTOR(S) : Okamura et al.

It is certified that error appears in the above-identified patent and that said Letters Patent is hereby corrected as shown below:

Column 10,
Line 28, "vice versa, end" should read -- vice versa, and --.
Line 31, "of s respective" should read -- of a respective --.
Line 34, "capacitors, and control" should read -- capacitors, said control --.

Signed and Sealed this

Fourth Day of October, 2005

JON W. DUDAS
*Director of the United States Patent and Trademark Office*